United States Patent
Huang et al.

(10) Patent No.: US 11,940,293 B2
(45) Date of Patent: Mar. 26, 2024

(54) FINGER DEVICES WITH SELF-MIXING INTERFEROMETRIC PROXIMITY SENSORS

(71) Applicant: Apple Inc., Cupertino, CA (US)

(72) Inventors: Mengshu Huang, Cupertino, CA (US); Ahmet Fatih Cihan, San Jose, CA (US); Adrian Z. Harb, San Jose, CA (US); Stephen E. Dey, San Francisco, CA (US); Yuhao Pan, Sunnyvale, CA (US); Mehmet Mutlu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 336 days.

(21) Appl. No.: 17/465,594

(22) Filed: Sep. 2, 2021

(65) Prior Publication Data

US 2023/0073039 A1  Mar. 9, 2023

(51) Int. Cl.
*G01C 3/08* (2006.01)
*G01B 9/02* (2022.01)
(Continued)

(52) U.S. Cl.
CPC ........... *G01C 3/08* (2013.01); *G01B 9/02092* (2013.01); *G06F 3/014* (2013.01); *G06F 3/016* (2013.01);
(Continued)

(58) Field of Classification Search
CPC . G01C 3/08; G06F 3/014; G06F 3/016; G06F 3/017; G06F 3/03; G06F 2203/0331; G01B 9/02097; G01B 9/02092
(Continued)

(56) References Cited

U.S. PATENT DOCUMENTS 6,236,037 B1 * 5/2001 Asada .................. G01L 5/22
250/221
10,342,458 B2 * 7/2019 Ferreira ................. G06F 3/017
(Continued)

FOREIGN PATENT DOCUMENTS

WO    WO-2022046337 A1 *  3/2022  ............... G01F 3/01

OTHER PUBLICATIONS

Nguyen, Anh Mai, "3DTOUCH: Towards a Wearable 3D Input Device for 3D Applications", Aug. 2014 (Year: 2014).*
(Continued)

*Primary Examiner* — Michelle M Iacoletti
*Assistant Examiner* — Noah J. Haney
(74) *Attorney, Agent, or Firm* — Treyz Law Group, P.C.; G. Victor Treyz; Joseph F. Guihan

(57) ABSTRACT

A system may include one or more finger devices that gather input from a user's fingers. A finger device may include one or more self-mixing interferometric proximity sensors that measure a distance to the user's finger. The proximity sensor may measure changes in distance between the proximity sensor and a flexible membrane that rests against a side portion of the user's finger. The self-mixing interferometric proximity sensor may include a laser and a photodiode. In some arrangements, a single laser driver may drive the lasers of multiple self-mixing proximity sensors using time-multiplexing. The self-mixing proximity sensor may operate according to a duty cycle. Interpolation and stitching may be used to determine the total displacement of the user's finger including both the on periods and off periods of the self-mixing proximity sensor.

19 Claims, 13 Drawing Sheets

(51) Int. Cl.
  *G01B 9/02097* (2022.01)
  *G06F 3/01* (2006.01)
  *G06F 3/03* (2006.01)

(52) U.S. Cl.
  CPC .......... *G01B 9/02097* (2013.01); *G06F 3/017* (2013.01); *G06F 3/03* (2013.01); *G06F 2203/0331* (2013.01)

(58) Field of Classification Search
  USPC ........................................................ 356/498
  See application file for complete search history.

(56) References Cited

U.S. PATENT DOCUMENTS

| | | | |
|---|---|---|---|
| 11,231,786 B1* | 1/2022 | Elangovan | G06F 3/017 |
| 2002/0139920 A1 | 10/2002 | Seibel et al. | |
| 2002/0160740 A1 | 10/2002 | Hatcher et al. | |
| 2009/0174885 A1 | 7/2009 | Li | |
| 2010/0240973 A1* | 9/2010 | Presura | A61B 5/14551 600/323 |
| 2011/0210931 A1* | 9/2011 | Shai | G06F 3/03547 345/173 |
| 2014/0368832 A1 | 12/2014 | Salvade et al. | |
| 2017/0265753 A1* | 9/2017 | Baek | A61B 5/02438 |
| 2019/0313178 A1 | 10/2019 | Mutlu et al. | |
| 2019/0346360 A1 | 11/2019 | Jutte et al. | |
| 2020/0026352 A1 | 1/2020 | Wang et al. | |
| 2020/0174583 A1* | 6/2020 | Wang | G06F 3/011 |
| 2020/0356137 A1* | 11/2020 | Wang | G06F 3/011 |
| 2020/0374620 A1 | 11/2020 | McCord | |

OTHER PUBLICATIONS

H. Kristanto, P. Sathe, A. Schmitz, T. P. Tomo, S. Somlor and S. Sugano, "A Wearable Three-Axis Tactile Sensor for Human Fingertips," in IEEE Robotics and Automation Letters, vol. 3, No. 4, pp. 4313-4320, Oct. 2018 (Year: 2018).*

* cited by examiner

FINGER DEVICES WITH SELF-MIXING INTERFEROMETRIC PROXIMITY SENSORS

FIELD

This relates generally to electronic devices, and, more particularly, to sensors for finger-mounted electronic devices.

BACKGROUND

Electronic devices such as computers can be controlled using computer mice and other input accessories. In virtual reality systems, force-feedback gloves can be used to control virtual objects. Cellular telephones may have touch screen displays and vibrators that are used to create haptic feedback in response to touch input.

Devices such as these may not be convenient for a user, may be cumbersome or uncomfortable, or may provide inadequate feedback.

SUMMARY

A system may include one or more finger devices that gather input from a user's fingers. The system may include control circuitry that sends control signals to an electronic device based on the input gathered with the finger devices.

A finger device may include one or more proximity sensors that measure a distance to the user's finger. The proximity sensor may be an optical proximity sensor such as a self-mixing interferometric optical proximity sensor having a laser and photodiode. The proximity sensor may have submicron resolution and may be configured to detect very small movements of the user's finger. The proximity sensor may measure changes in distance between the proximity sensor and a flexible membrane that rests against a side portion of the user's finger.

A self-mixing proximity sensor may have a coherent or partially coherent source of electromagnetic radiation. The source of radiation may, for example, be a coherent light source such as an infrared vertical cavity surface-emitting laser, a quantum cascade laser, or other laser. The self-mixing proximity sensor may also have a light detector such as a photodiode and/or other electromagnetic-radiation-sensitive element. The photodiode may be stacked with the laser and/or may be an intra-cavity photodiode that is located within the laser cavity. In some arrangements, a single laser driver may drive the lasers of multiple self-mixing proximity sensors using time-multiplexing.

The self-mixing proximity sensor may operate according to a duty cycle. Interpolation and stitching may be used to determine the total displacement of the user's finger including both the on periods and off periods of the self-mixing proximity sensor.

DETAILED DESCRIPTION

Figure 1:
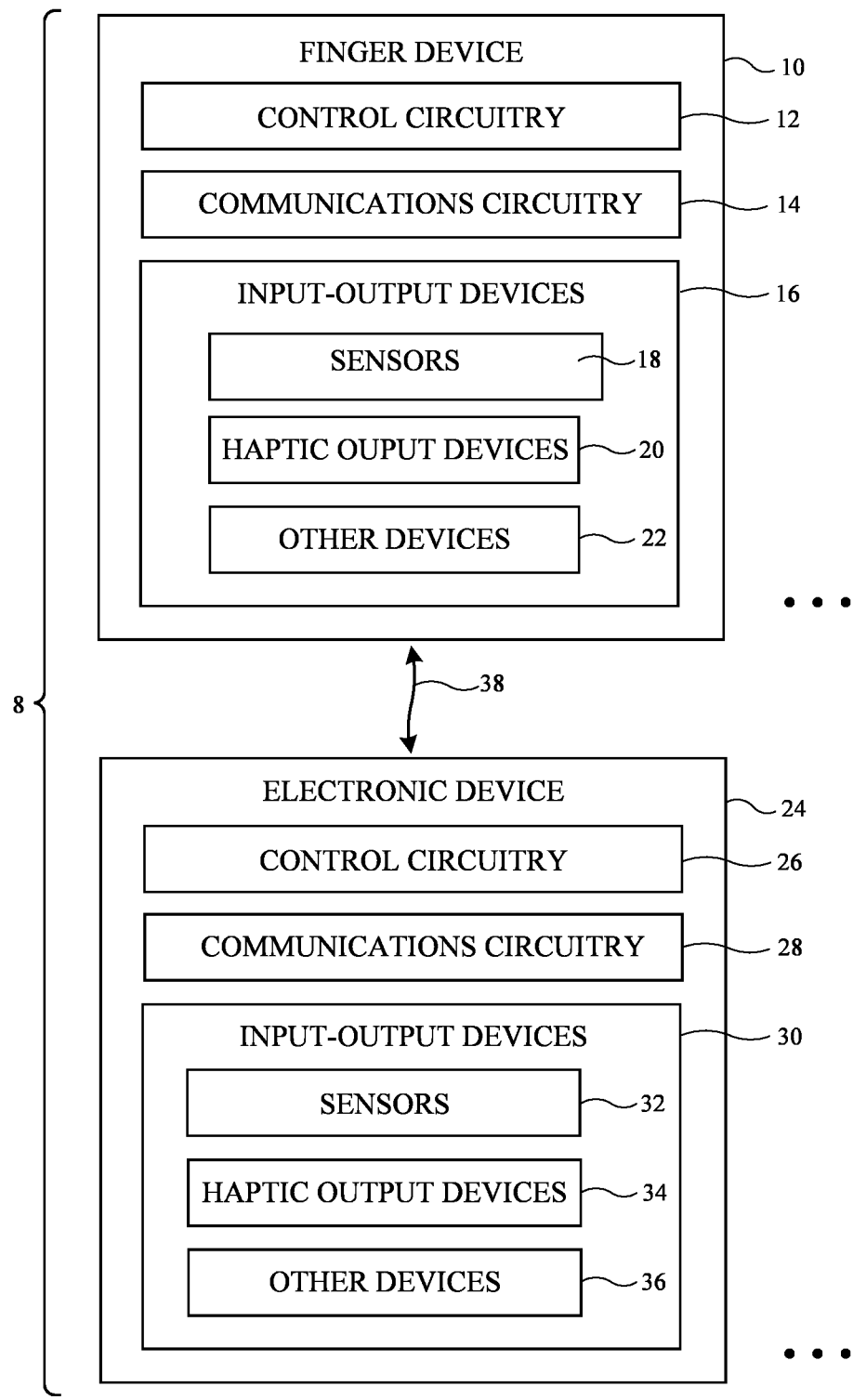
FIG. 1 is a schematic diagram of an illustrative system with a finger device in accordance with an embodiment.

Electronic devices that are configured to be mounted on the body of a user may be used to gather user input and to provide a user with output. For example, electronic devices that are configured to be worn on one or more of a user's fingers, which are sometimes referred to as finger devices or finger-mounted devices, may be used to gather user input and to supply output. A finger device may, as an example, include an inertial measurement unit with an accelerometer for gathering information on finger motions such as finger taps or free-space finger gestures, may include proximity sensors such as self-mixing interferometric optical proximity sensors for measuring small changes in distance to the finger surface as the finger moves, may include force sensors for gathering information on normal and shear forces in the finger device and the user's finger, and may include other sensors for gathering information on the interactions between the finger device (and the user's finger on which the device is mounted) and the surrounding environment. The finger device may include a haptic output device to provide the user's finger with haptic output and may include other output components.

One or more finger devices may gather user input from a user. The user may use finger devices in operating a virtual reality or mixed reality device (e.g., head-mounted equipment such as glasses, goggles, a helmet, or other device with a display) and/or in operating other equipment such as desktop computers, laptop computers, tablet computers, and other electronic devices. During operation, the finger devices may gather user input such as information on interactions between the finger device(s) and the surrounding environment (e.g., interactions between a user's fingers and the environment, including finger motions and other interactions associated with virtual content displayed for a user). The user input may be used in controlling visual output on the display. Corresponding haptic output may be provided to the user's fingers using the finger devices. Haptic output may be used, for example, to provide the fingers of a user with a desired texture sensation as a user is touching a real object or as a user is touching a virtual object. Haptic output can also be used to create detents and other haptic effects.

Finger devices can be worn on any or all of a user's fingers (e.g., the index finger, the index finger and thumb, three of a user's fingers on one of the user's hands, some or all fingers on both hands, etc.). To enhance the sensitivity of a user's touch as the user interacts with surrounding objects, finger devices may have inverted U shapes or other configurations that allow the finger devices to be worn over the top and sides of a user's fingertips while leaving the user's finger pads exposed. In other words, the fiber device does not cover the user's finger pad surface. This allows a user to touch objects with the finger pad portions of the user's fingers during use. If desired, finger devices may be worn over knuckles on a user's finger, between knuckles, and/or on other portions of a user's finger. The use of finger devices on a user's fingertips is sometimes described herein as an example.

Users can use the finger devices to interact with any suitable electronic equipment. For example, a user may use one or more finger devices to interact with a virtual reality or mixed reality system (e.g., a head-mounted device with a display), to supply input to a desktop computer, tablet computer, cellular telephone, watch, ear buds, or other accessory, or to interact with other electronic equipment.

FIG. 1 is a schematic diagram of an illustrative system of the type that may include one or more finger devices. As shown in FIG. 1, system 8 may include electronic device(s) such as finger device(s) 10 and other electronic device(s) 24. Each finger device 10 may be worn on a finger of a user's hand. Additional electronic devices in system 8 such as devices 24 may include devices such as a laptop computer, a computer monitor containing an embedded computer, a tablet computer, a desktop computer (e.g., a display on a stand with an integrated computer processor and other computer circuitry), a cellular telephone, a media player, or other handheld or portable electronic device, a smaller device such as a wristwatch device, a pendant device, a headphone or earpiece device, a head-mounted device such as glasses, goggles, a helmet, or other equipment worn on a user's head, or other wearable or miniature device, a television, a computer display that does not contain an embedded computer, a gaming device, a remote control, a navigation device, an embedded system such as a system in which equipment is mounted in a kiosk, in an automobile, airplane, or other vehicle, a removable external case for electronic equipment, a strap, a wrist band or head band, a removable cover for a device, a case or bag that has straps or that has other structures to receive and carry electronic equipment and other items, a necklace or arm band, a wallet, sleeve, pocket, or other structure into which electronic equipment or other items may be inserted, part of a chair, sofa, or other seating (e.g., cushions or other seating structures), part of an item of clothing or other wearable item (e.g., a hat, belt, wrist band, headband, sock, glove, shirt, pants, etc.), or equipment that implements the functionality of two or more of these devices.

With one illustrative configuration, which may sometimes be described herein as an example, device 10 is a finger-mounted device having a finger-mounted housing with a U-shaped body that grasps a user's finger or a finger-mounted housing with other shapes configured to rest against a user's finger and device(s) 24 is a cellular telephone, tablet computer, laptop computer, wristwatch device, head-mounted device, a device with a speaker, or other electronic device (e.g., a device with a display, audio components, and/or other output components). A finger device with a U-shaped housing may have opposing left and right sides that are configured to receive a user's finger and a top housing portion that couples the left and right sides and that overlaps the user's fingernail.

Devices 10 and 24 may include control circuitry 12 and 26. Control circuitry 12 and 26 may include storage and processing circuitry for supporting the operation of system 8. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 12 and 26 may be used to gather input from sensors and other input devices and may be used to control output devices. The processing circuitry may be based on one or more microprocessors, microcontrollers, digital signal processors, baseband processors and other wireless communications circuits, power management units, audio chips, application specific integrated circuits, etc.

To support communications between devices 10 and 24 and/or to support communications between equipment in system 8 and external electronic equipment, control circuitry 12 may communicate using communications circuitry 14 and/or control circuitry 26 may communicate using communications circuitry 28. Circuitry 14 and/or 28 may include antennas, radio-frequency transceiver circuitry, and other wireless communications circuitry and/or wired communications circuitry. Circuitry 14 and/or 26, which may sometimes be referred to as control circuitry and/or control and communications circuitry, may, for example, support bidirectional wireless communications between devices 10 and 24 over wireless link 38 (e.g., a wireless local area network link, a near-field communications link, or other suitable wired or wireless communications link (e.g., a Bluetooth® link, a WiFi® link, a 60 GHz link or other millimeter wave link, etc.). Devices 10 and 24 may also include power circuits for transmitting and/or receiving wired and/or wireless power and may include batteries. In configurations in which wireless power transfer is supported between devices 10 and 24, in-band wireless communications may be supported using inductive power transfer coils (as an example).

Devices 10 and 24 may include input-output devices such as devices 16 and 30. Input-output devices 16 and/or 30 may be used in gathering user input, in gathering information on the environment surrounding the user, and/or in providing a user with output. Devices 16 may include sensors 18 and devices 24 may include sensors 32. Sensors 18 and/or 32 may include proximity sensors (e.g., self-mixing optical proximity sensors), force sensors (e.g., strain gauges, capacitive force sensors, resistive force sensors, etc.), audio sensors such as microphones, touch and/or proximity sensors such as capacitive sensors, optical sensors such as optical sensors that emit and detect light, ultrasonic sensors (e.g., ultrasonic sensors for tracking device orientation and location and/or for detecting user input such as finger input), and/or other touch sensors and/or proximity sensors, monochromatic and color ambient light sensors, image sensors, sensors for detecting position, orientation, and/or motion (e.g., accelerometers, magnetic sensors such as compass sensors, gyroscopes, and/or inertial measurement units that contain some or all of these sensors), muscle activity sensors (EMG) for detecting finger actions, radio-frequency sensors, depth sensors (e.g., structured light sensors and/or depth sensors based on stereo imaging devices), optical sensors such as self-mixing sensors and light detection and ranging (lidar) sensors that gather time-of-flight measurements, optical sensors such as visual odometry sensors that gather position and/or orientation information using images gathered with digital image sensors in cameras, gaze tracking sensors, visible light and/or infrared cameras having digital image sensors, humidity sensors, moisture sensors, and/or other sensors. In some arrangements, devices 10 and/or 24 may use sensors 18 and/or 32 and/or other input-output devices 16 and/or 30 to gather user input (e.g., buttons may be used to gather button press input, touch sensors overlapping displays can be used for gathering user touch screen input, touch pads may be used in gathering touch input, microphones may be used for gathering audio input, accelerometers may be used in monitoring when a finger contacts an input surface and may therefore be used to gather finger press input, etc.). If desired, device 10 and/or device 24 may include rotating buttons (e.g., a crown mechanism on a watch or finger device or other suitable rotary button that rotates and optionally can be depressed to select items of interest). Alphanumeric keys and/or other buttons may be included in devices 16 and/or 30. In some configurations, sensors 18 may include joysticks, roller balls, optical sensors (e.g., lasers that emit light and image sensors that track motion by monitoring and analyzing changings in the speckle patterns and other information associated with surfaces illuminated with the emitted light as device 10 is moved relative to those surfaces), fingerprint sensors, and/or other sensing circuitry. Radio-frequency tracking devices may be included in sensors 18 to detect location, orientation, and/or range. Beacons (e.g., radio-frequency beacons) may be used to emit radio-frequency signals at different locations in a user's environment (e.g., at one or more registered locations in a user's home or office). Radio-frequency beacon signals can be analyzed by devices 10 and/or 24 to help determine the location and position of devices 10 and/or 24 relative to the beacons. If desired, devices 10 and/or 24 may include beacons. Frequency strength (received signal strength information), beacon orientation, time-of-flight information, and/or other radio-frequency information may be used in determining orientation and position information. At some frequencies (e.g., lower frequencies such as frequencies below 10 GHz), signal strength information may be used, whereas at other frequencies (e.g., higher frequencies such as frequencies above 10 GHz), indoor radar schemes may be used. If desired, light-based beacons, ultrasonic beacons, and/or other beacon devices may be used in system 8 in addition to or instead of using radio-frequency beacons and/or radio-frequency radar technology.

Devices 16 and/or 30 may include haptic output devices 20 and/or 34. Haptic output devices 20 and/or 34 can produce motion that is sensed by the user (e.g., through the user's fingertips). Haptic output devices 20 and/or 34 may include actuators such as electromagnetic actuators, motors, piezoelectric actuators, electroactive polymer actuators, vibrators, linear actuators (e.g., linear resonant actuators), rotational actuators, actuators that bend bendable members, actuator devices that create and/or control repulsive and/or attractive forces between devices 10 and/or 24 (e.g., components for creating electrostatic repulsion and/or attraction such as electrodes, components for producing ultrasonic output such as ultrasonic transducers, components for producing magnetic interactions such as electromagnets for producing direct-current and/or alternating-current magnetic fields, permanent magnets, magnetic materials such as iron or ferrite, and/or other circuitry for producing repulsive and/or attractive forces between devices 10 and/or 24). In some situations, actuators for creating forces in device 10 may be used in squeezing a user's finger and/or otherwise directly interacting with a user's finger pulp. In other situations, these components may be used to interact with each other (e.g., by creating a dynamically adjustable electromagnetic repulsion and/or attraction force between a pair of devices 10 and/or between device(s) 10 and device(s) 24 using electromagnets).

If desired, input-output devices 16 and/or 30 may include other devices 22 and/or 36 such as displays (e.g., in device 24 to display images for a user), status indicator lights (e.g., a light-emitting diode in device 10 and/or 24 that serves as a power indicator, and other light-based output devices), speakers and other audio output devices, electromagnets, permanent magnets, structures formed from magnetic material (e.g., iron bars or other ferromagnetic members that are attracted to magnets such as electromagnets and/or permanent magnets), batteries, etc. Devices 10 and/or 24 may also include power transmitting and/or receiving circuits configured to transmit and/or receive wired and/or wireless power signals.

Figure 2:
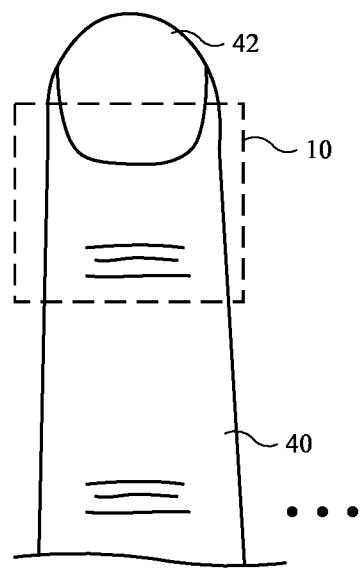
FIG. 2 is a top view of an illustrative finger of a user on which a finger device has been placed in accordance with an embodiment.

FIG. 2 is a top view of a user's finger (finger 40) and an illustrative finger-mounted device 10. As shown in FIG. 2, device 10 may be formed from a finger-mounted unit that is mounted on or near the tip of finger 40 (e.g., partly or completely overlapping fingernail 42). If desired, device 10 may be worn elsewhere on a user's fingers such as over a knuckle, between knuckles, etc. Configurations in which a device such as device 10 is worn between fingers 40 may also be used.

A user may wear one or more of devices 10 simultaneously. For example, a user may wear a single one of devices 10 on the user's ring finger or index finger. As another example, a user may wear a first device 10 on the user's thumb, a second device 10 on the user's index finger, and an optional third device 10 on the user's middle finger. Arrangements in which devices 10 are worn on other fingers and/or all fingers of one or both hands of a user may also be used.

Control circuitry 12 (and, if desired, communications circuitry 14 and/or input-output devices 16) may be contained entirely within device 10 (e.g., in a housing for a fingertip-mounted unit) and/or may include circuitry that is coupled to a fingertip structure (e.g., by wires from an associated wrist band, glove, fingerless glove, etc.). Configurations in which devices 10 have bodies that are mounted on individual user fingertips are sometimes described herein as an example.

Figure 3:
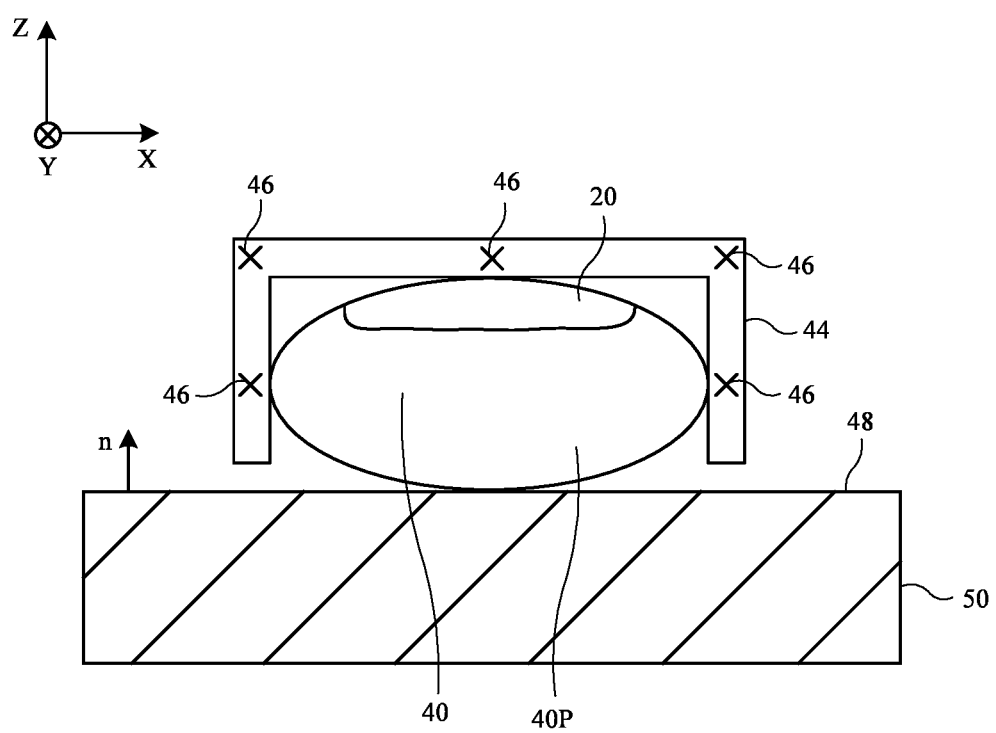
FIG. 3 is a cross-sectional side view of an illustrative finger device on the finger of a user in accordance with an embodiment.

FIG. 3 is a cross-sectional side view of an illustrative finger device (finger-mounted device) 10 showing illustrative mounting locations 46 for electrical components (e.g., control circuitry 12, communications circuitry 14, and/or input-output devices 16 such as sensors 18, haptic output devices 20, and/or other devices 22) within and/or on the surface(s) of finger device housing 44. These components may, if desired, be incorporated into other portions of housing 44.

As shown in FIG. 3, housing 44 may have a U shape (e.g., housing 44 may be a U-shaped housing structure that faces downwardly and covers the upper surface of the tip of user finger 40 and fingernail 42). During operation, a user may press against structures such as structure 50. As the bottom of finger 40 (e.g., finger pulp 40P) presses against surface 48 of structure 50, the user's finger may compress and force portions of the finger outwardly against the sidewall portions of housing 44 (e.g., for sensing by force sensors or other sensors mounted to the side portions of housing 44). Lateral movement of finger 40 in the X-Y plane may also be sensed using force sensors or other sensors on the sidewalls of housing 44 or other portions of housing 44 (e.g., because lateral movement will tend to press portions of finger 40 against some sensors more than others and/or will create shear forces that are measured by force sensors that are configured to sense shear forces).

The sensors in device 10 may, for example, measure how forcefully a user is moving device 10 (and finger 40) against surface 48 (e.g., in a direction parallel to the surface normal n of surface 48 such as the −Z direction of FIG. 3) and/or how forcefully a user is moving device 10 (and finger 40) within the X-Y plane, tangential to surface 48. The direction of movement of device 10 in the X-Y plane and/or in the Z direction can also be measured by the force sensors and/or other sensors 18 at locations 46.

Structure 50 may be a portion of a housing of device 24, may be a portion of another device 10 (e.g., another housing 44), may be a portion of a user's finger 40 or other body part, may be a surface of a real-world object such as a table, a movable real-world object such as a bottle or pen, or other inanimate object external to device 10, and/or may be any other structure that the user can contact with finger 40 while moving finger 40 in a desired direction with a desired force. Because motions such as these can be sensed by device 10, device(s) 10 can be used to gather pointing input (e.g., input moving a cursor or other virtual object on a display such as a display in devices 36), can be used to gather tap input, swipe input, pinch-to-zoom input (e.g., when a pair of devices 10 is used), or other gesture input (e.g., finger gestures, hand gestures, arm motions, etc.), and/or can be used to gather other user input.

Figure 4A:
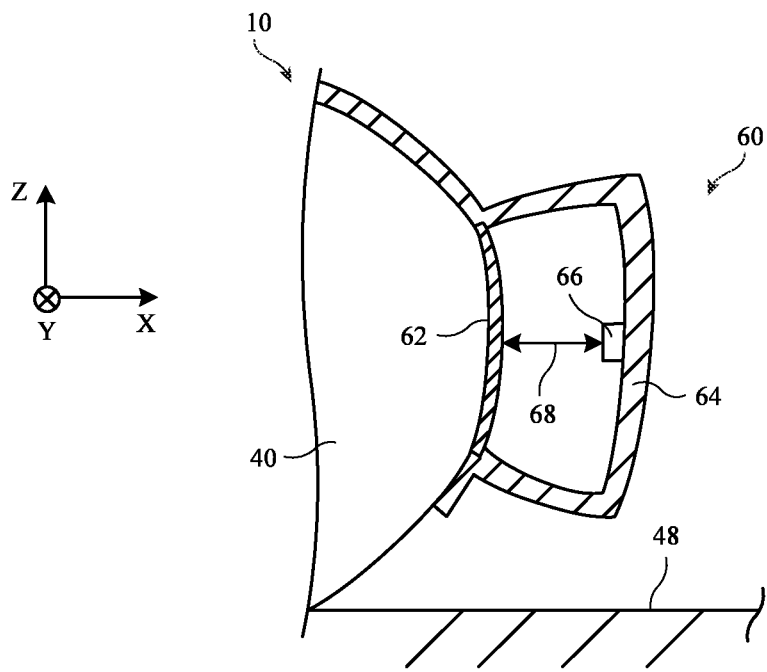
FIGS. 4A and 4B are cross-sectional side views of an illustrative finger device with a self-mixing interferometric proximity sensor on the side of the finger of a user in accordance with an embodiment.
Figure 4B:
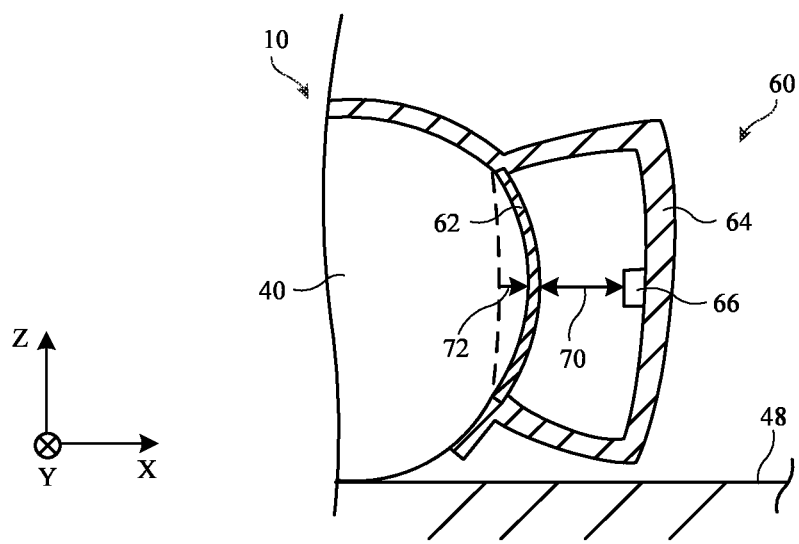

FIGS. 4A and 4B show in greater detail how a sensor in device 10 may measure how forcefully a user is moving device 10 (and finger 40) against surface 48 (e.g., the −Z direction of FIG. 4). As shown in FIG. 4A, sensor module 60 (sometimes referred to as a sensor 60) is positioned on a side of finger 40. Sensor module 60 includes a flexible membrane 62, a rigid housing portion 64, and a self-mixing interferometric (SMI) proximity sensor 66 (sometimes referred to as self-mixing proximity sensor 66, self-mixing sensor 66, self-mixing optical proximity sensor 66, etc.).

Self-mixing proximity sensor 66 may have a coherent or partially coherent source of electromagnetic radiation. The source of radiation may, for example, be a coherent light source such as an infrared vertical cavity surface-emitting laser (VCSEL), a quantum cascade laser, or other laser. The self-mixing proximity sensor may also have a light detector such as a photodiode and/or other electromagnetic-radiation-sensitive element.

Self-mixing proximity sensors may have submicron resolution and may be configured to detect very small changes in distance. This allows sensor 66 to detect very small movements of finger 40 (sometimes referred to as microgestures or nanogestures).

In FIG. 4A, finger 40 is lightly contacting (or not contacting) surface 48. With this amount of force applied in the negative Z-direction, membrane 62 is positioned a distance 68 from the self-mixing proximity sensor. In FIG. 4B, finger 40 presses harder on surface 48 than in FIG. 4A. Applying this increased force in the negative Z-direction (relative to as in FIG. 4A) causes the edge of finger 40 to expand in the X-direction (as reflected by displacement 72). This in turn causes flexible membrane 62 to be pushed closer to self-mixing proximity sensor 66. In FIG. 4B, membrane 62 is positioned a distance 70 from the self-mixing proximity sensor. Distance 70 in FIG. 4B is less than distance 68 in FIG. 4A. Self-mixing proximity sensor 66 has sufficiently high resolution to detect the change in distance to the flexible membrane between FIG. 4A and FIG. 4B.

Figure 5:
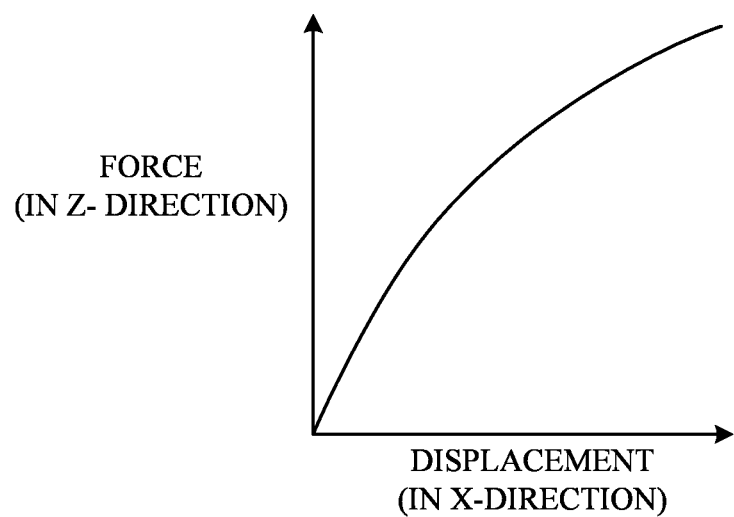
FIG. 5 is a graph of force as a function of displacement for the side of the finger of a user in accordance with an embodiment.

Flexible membrane 62 may conform to the side of finger 40. In this way, changes in the shape/position of finger 40 caused by finger 40 applying force to surface 48 may be translated to displacement in flexible membrane 62 that is in turn detected by self-mixing proximity sensor 66. FIG. 5 is a graph of force (applied by the finger in the negative Z-direction) as a function of displacement of the flexible membrane (in the positive X-direction). As shown, the displacement increases with increasing force applied by the finger. Therefore, the displacement measured by the self-mixing proximity sensor may be used to determine the force applied by the finger.

Rigid housing portion 64 may optionally be formed integrally with finger device housing 44. In other words, housing 44 has a portion that forms the housing for sensor module 60. Alternatively, rigid housing portion 64 for sensor module 60 may be formed separately from finger device housing 44 and attached to finger device housing 44.

Figure 6A:
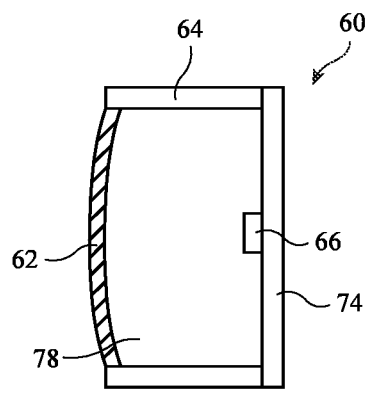
FIG. 6A is a cross-sectional side view of an illustrative self-mixing interferometric proximity sensor that includes a flexible membrane attached to rigid sidewalls in accordance with an embodiment.

There are many possible arrangements for rigid and flexible components within sensor module 60. FIG. 6A shows an arrangement where self-mixing proximity sensor 66 is positioned on a substrate 74. Substrate 74 may be a rigid printed circuit board, a flexible printed circuit board, or another desired substrate. In some cases, substrate 74 may itself be a rigid housing structure (e.g., structure 64 in FIG. 4A). Module 60 also includes rigid housing structures 64. In FIG. 6A, the rigid housing structures 64 form sidewalls for the sensor module. Flexible membrane 62 is attached to the rigid sidewalls and forms the finger-interfacing portion of the sensor. In other words, flexible membrane 62 is configured to directly contact finger 40 during operation of sensor module 60. Flexible membrane 62 may be formed from silicone or another desired material. The flexible membrane is sufficiently flexible to move towards self-mixing proximity sensor 66 when biased (e.g., when the finger touches a surface) as discussed in connection with FIGS. 4A and 4B.

Figure 6B:
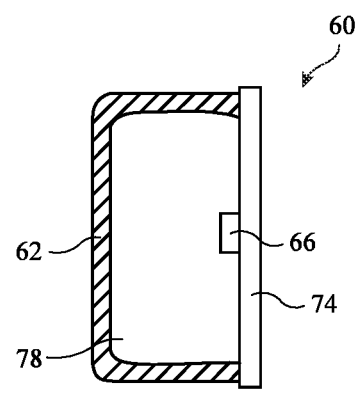
FIG. 6B is a cross-sectional side view of an illustrative self-mixing interferometric proximity sensor that includes a continuous flexible membrane in accordance with an embodiment.

The example of FIG. 6A is merely illustrative. In another possible arrangement, shown in FIG. 6B, flexible membrane 62 forms the sidewalls of the sensor module in addition to the finger-interfacing portion. Flexible membrane 62 may be formed from silicone or another desired material. In the arrangement of FIG. 6B, flexible membrane 62 may be three-dimensional (3D) printed to have the desired shape for the sensor module. The flexible membrane 62 is attached directly to substrate 74. The flexible membrane has sufficient structural integrity to maintain the shape shown in FIG. 6B when no bias force is applied to the flexible membrane. However, the flexible membrane is sufficiently flexible to move towards self-mixing proximity sensor 66 when biased (e.g., when the finger touches a surface) as discussed in connection with FIGS. 4A and 4B.

Figure 6C:
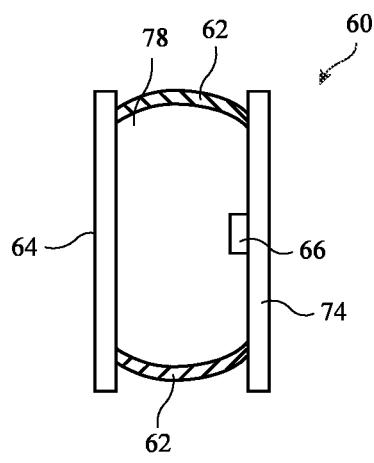
FIG. 6C is a cross-sectional side view of an illustrative self-mixing interferometric proximity sensor that includes a rigid structure attached to flexible sidewalls in accordance with an embodiment.

In another arrangement, shown in FIG. 6C, rigid structure 64 is configured to contact finger 40 during operation of device 10. Rigid structure 64 is connected to substrate 74 by flexible sidewalls 62. The flexible sidewalls are sufficiently flexible to allow rigid structure 64 to move towards self-mixing proximity sensor 66 when biased (e.g., when the finger touches a surface).

Figure 6D:
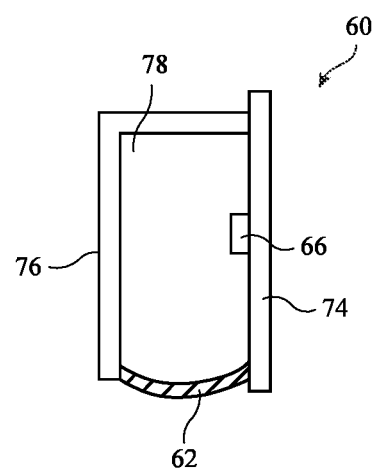
FIG. 6D is a cross-sectional side view of an illustrative self-mixing interferometric proximity sensor that includes a semi-rigid, cantilever structure in accordance with an embodiment.

In yet another possible arrangement, shown in FIG. 6D, a semi-rigid structure 76 with a sidewall portion and a finger-interfacing portion is attached to substrate 74. The semi-rigid structure 76 has a cantilever arrangement. Opposite the semi-rigid sidewall portion is a flexible sidewall 62 that allows for the semi-rigid structure 76 to move towards self-mixing proximity sensor 66 when biased (e.g., when the finger touches a surface).

The aforementioned flexible membranes 62 may have a Young's modulus of less than 1 GPa, less than 0.5 GPa, less than 0.1 GPa, less than 0.01 GPa, greater than 0.01 GPa, between 0.01 GPa and 0.5 GPa, etc. The semi-rigid structure 76 may have a higher Young's modulus than flexible membrane 62. Rigid structures 64 may have a higher Young's modulus than semi-rigid structure 76 and flexible membrane 62.

In FIGS. 6A-6D, the sensor module includes various flexible and rigid components that define a cavity. In some arrangements, the cavity is filled with air (and may be referred to as an air-filled cavity). If desired, the cavity may instead be filled with an optically clear filler material 78. The optically clear filler material may have a refractive index that is greater than 1.3, greater than 1.4, greater than 1.5, greater than 1.6, less than 1.6, between 1.4 and 1.6, etc. The optically clear filler material may help prevent contaminants from interfering with operation of self-mixing proximity sensor 66.

FIG. 6B shows one example where a unitary flexible membrane defines the sidewalls and finger-interfacing portion of the sensor module. In FIG. 6B, the flexible membrane has planar sidewalls, a planar finger-interfacing portion (that is configured to conform to and/or contact the side of the user's finger when the finger device is worn by the user), and rounded corners (e.g., 1 bend) between the planar sidewalls and planar finger-interfacing portion. This example is merely illustrative. FIGS. 7A-7D show alternative shapes that may be used for a unitary flexible membrane that defines the sidewalls and finger-interfacing portion of the sensor module.

Figure 7A:
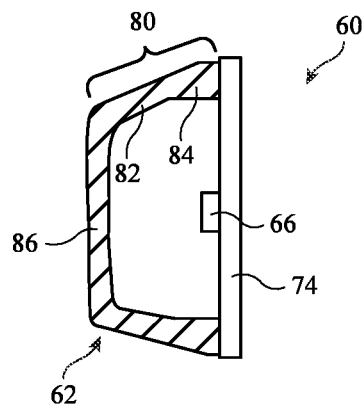
FIGS. 7A-7D are cross-sectional side views of illustrative self-mixing interferometric proximity sensors that includes continuous flexible membranes of various shapes in accordance with an embodiment.

In FIG. 7A, flexible membrane 62 includes a sidewall portion 80 and a finger-interfacing portion 86. Sidewall portion 80 has an angled portion 82 and a base 84 that is wider than angled portion 82. Angled portion 82 is at a non-orthogonal angle relative to substrate 74. Finger-interfacing portion 86 is planar and is connected to angled portion 82. Finger-interfacing portion 86 is parallel to substrate 74.

Figure 7B:
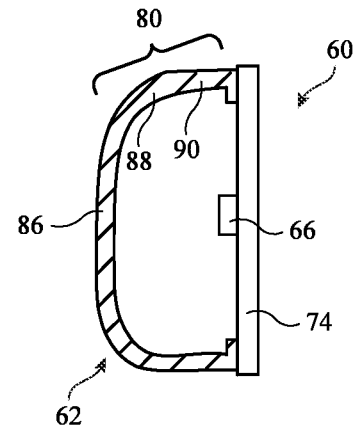

In FIG. 7B, flexible membrane 62 includes a sidewall portion 80 and a finger-interfacing portion 86. Sidewall portion 80 has a rounded corner portion 88 and a base portion 90 that is orthogonal to substrate 74. Rounded corner portion 88 connects planar base portion 90 to planar finger-interfacing portion 86. Finger-interfacing portion 86 is parallel to substrate 74. Planar base portion 90 is orthogonal to substrate 74.

Figure 7C:
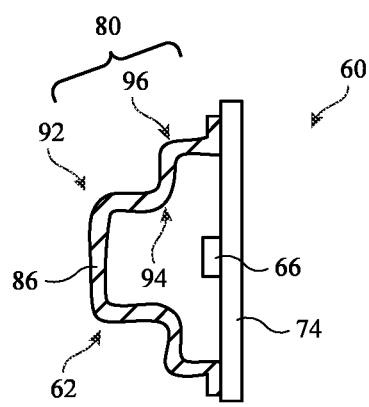

In FIG. 7C, flexible membrane 62 includes a sidewall portion 80 with three bends (92, 94, and 96) between the substrate 74 and a planar finger-interfacing portion 86. Finger-interfacing portion 86 is parallel to substrate 74. A first portion of the flexible membrane between bend 96 and substrate 74 is at an orthogonal angle relative to the substrate. A second portion of the flexible membrane between bends 94 and 96 is parallel to the substrate. A third portion of the flexible membrane between bends 92 and 94 is orthogonal to the substrate.

Figure 7D:
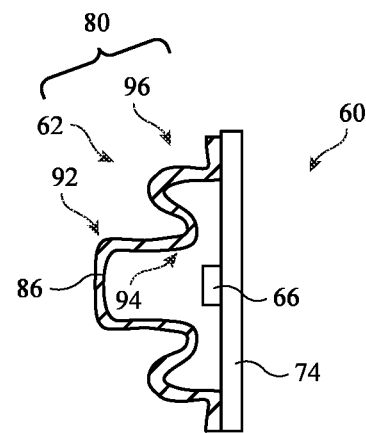

In FIG. 7D, flexible membrane 62 again includes a sidewall portion 80 with three bends (92, 94, and 96) between the substrate 74 and a planar finger-interfacing portion 86. A first portion of the flexible membrane between bend 96 and substrate 74 is at an orthogonal angle relative to the substrate. A second portion of the flexible membrane between bends 94 and 96 doubles back towards the substrate 74 and is at a non-orthogonal angle relative to the substrate. A third portion of the flexible membrane between bends 92 and 94 is orthogonal to the substrate.

The flexible membrane shapes of FIGS. 7A-7D provide different resistance forces as a function of finger deformation. A flexible membrane shape may be selected that provides a desired resistance force at finger deformations of interest. The flexible membrane shapes of FIGS. 7A-7D may also help ensure that deformation is concentrated at the center of the flexible membrane towards the self-mixing proximity sensor 66 (as opposed to deformation occurring at off-center portions of the membrane that are more difficult to detect with sensor 66).

Figure 8:
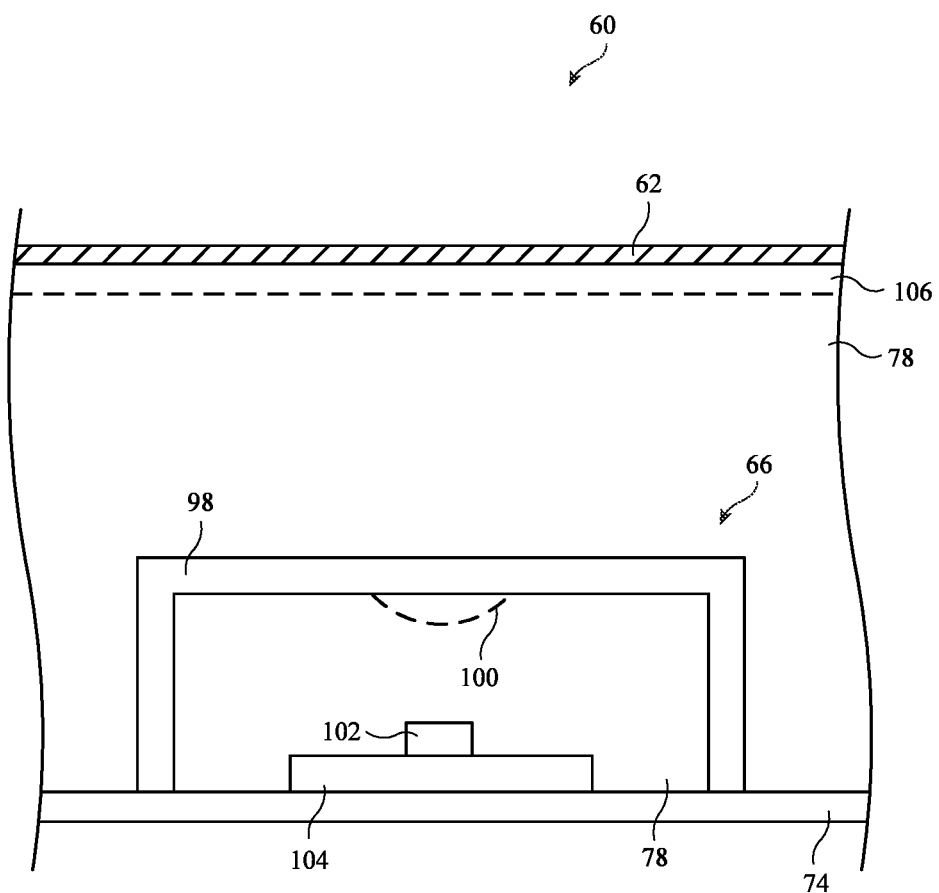
FIG. 8 is a cross-sectional side view of an illustrative self-mixing interferometric proximity sensor that includes a vertical cavity surface-emitting laser, a photodiode, and a transparent cap in accordance with an embodiment.

FIG. 8 is a cross-sectional side view of sensor module 60. Sensor module 60 includes a self-mixing proximity sensor 66 that detects the proximity of a flexible membrane 62 (as opposed to a rigid structure as in FIG. 6C, for example). In FIG. 8, the self-mixing proximity sensor includes an infrared light source such as a vertical cavity surface-emitting laser (VCSEL) 102. The VCSEL 102 serves as a coherent source of electromagnetic radiation for the sensor. The self-mixing proximity sensor also has a photodiode 104 that is used to sense the light transmitted by VCSEL 102.

In FIG. 8, the photodiode 104 is stacked with the laser 102. The photodiode may have a photosensitive area that forms a ring around VCSEL 102 (when viewed from above). This example is merely illustrative. In another possible arrangement, the photodiode 104 may be an intra-cavity photodiode that is located within the laser cavity of laser 102.

Laser 102 may emit light towards the target (flexible membrane 62 with optional reflective coating 106). The light reflects off of the target towards laser 102 and photodiode 104. Terminals of photodiode 104 may be coupled to sensing circuitry in control circuitry 12. This circuitry gathers photodiode output signals that are produced in response to reception of light that is reflected off the flexible membrane. In addition to using a photodiode, self-mixing can be detected using laser junction voltage measurements (e.g., if the laser is driven at a constant bias current) or laser bias current (e.g., if the laser is driven at a constant voltage).

Some of the light that is reflected or backscattered from the flexible membrane (target) reenters the laser cavity of laser 102 and perturbs the electric field coherently, which also reflects as a perturbation to the carrier density in laser 102. These perturbations in laser 102 cause coherent self-mixing fluctuations in the power of light emitted by the laser and associated operating characteristics of laser 102 such as laser junction voltage and/or laser bias current. These fluctuations may be monitored. For example, the fluctuations in the power of light from laser 102 may be monitored using photodiode 104.

Control circuitry in device 10 can modulate the laser bias current signal for laser 102 to produce a target distance measurement corresponding to a distance between the self-mixing proximity sensor and the flexible membrane that rests against the user's finger. This modulation can enable the detection of the relative displacement of the user's finger. Sensor 66 may have submicron resolution, allowing for small displacements of the user's finger to be accurately measured.

The stacked photodiode 104 and laser 102 may be covered by a transparent cap 98. Transparent cap 98 may be formed from transparent glass, plastic, or another desired material. If desired, the transparent cap may optionally have an integrated lens 100 formed over the stacked photodiode 104 and laser 102. The lens may be formed integrally with the transparent cap or may be formed from a separate material that is attached to the transparent cap. The lens may increase the signal-to-noise ratio of the sensor as well as reduce the overall target area of the sensor (allowing for flexible membrane 62 to have a reduced size).

Optically clear filler material 78 may optionally be included in sensor 66 (between transparent cap 98 and the stacked photodiode 104 and laser 102) and/or in sensor module 60 (between flexible membrane 62 and sensor 66).

The target used by the self-mixing proximity sensor 66 may impact the performance of the sensor. Detecting the displacement of flexible membrane 62 (instead of a user's finger directly without an intervening flexible membrane) may have the advantage of providing a uniform target having optimized optical properties.

To optimize the properties of the self-mixing proximity sensor target, a reflective coating 106 may be attached to an interior surface of flexible membrane 62. Said another way, the flexible membrane may include a flexible layer (e.g., formed from silicone) that is coupled to a reflective coating/tape. In this type of arrangement, flexible membrane 62 has optimized physical properties (e.g., optimized flexibility) and reflective coating 106 has optimized optical properties for the self-mixing proximity sensor 66. Coating 106 may be a metallic mirror-like coating (or tape) that has high specular reflection on the light emitted by laser 102. Alternatively, the coating 106 may be a retro-reflector coating (or tape) that reflects incident light at an angle equal to the incidence angle. This causes a diverging beam (from the laser) to be focused back into the laser aperture. In another possible arrangement, coating 106 may be omitted and flexible membrane 62 itself serves as the target for sensor 66.

Figure 9:
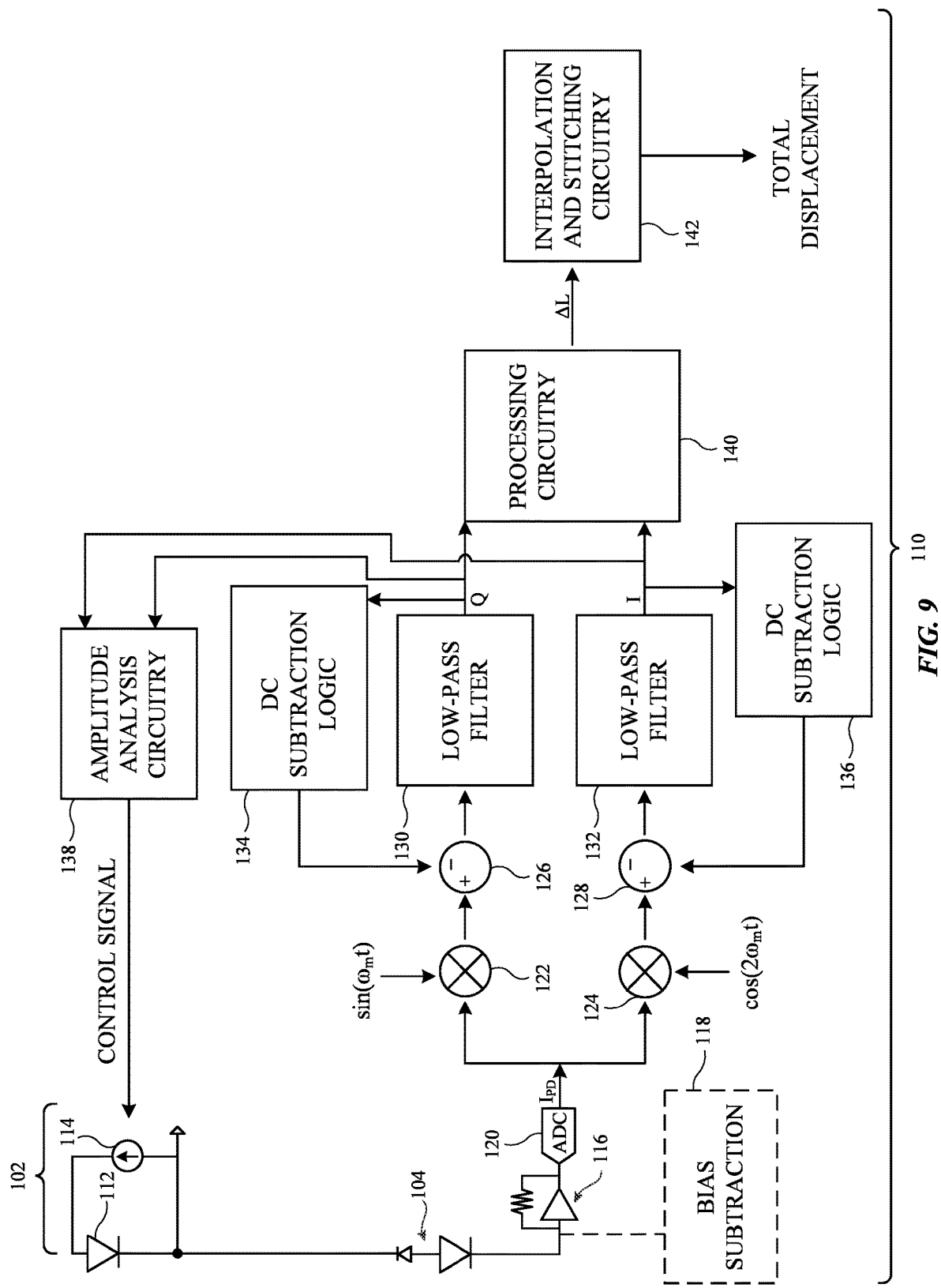
FIG. 9 is a schematic diagram of illustrative sensing circuitry that may be used to determine displacement using the self-mixing interferometric proximity sensor in accordance with an embodiment.

FIG. 9 is a schematic diagram of sensing circuitry 110 that may be used to detect displacement of flexible membrane 62 using proximity sensor 66. Sensing circuitry 110 may be considered part of control circuitry 12 in FIG. 1 and may sometimes be referred to as control circuitry 110.

FIG. 9 shows laser 102 including light-emitting diode 112 and laser driver 114. Laser driver 114 modulates the laser bias current signal for laser 102 (e.g., using a sine wave, triangular wave, square wave, trapezoid wave, etc.). Photodiode 104 may be used to detect self-mixing fluctuations in the output power of laser 102. Sensing circuitry 110 is coupled to photodiode 104.

Sensing circuitry 110 includes a transimpedance amplifier (TIA) 116 that converts the photodiode current into a representative voltage. The voltage output by the transimpedance amplifier is then converted into a digital signal by analog-to-digital convertor (ADC) 120. The output of ADC 120 is therefore a digital value that represents the photodiode current ($I_{PD}$). Sensing circuitry 110 may perform further processing on the detected photodiode current to determine the total displacement of the flexible membrane. Bias subtraction circuitry 118 may optionally be included to remove a bias before converting the photodiode current to a voltage using transimpedance amplifier 116.

First, as shown in FIG. 9, the $I_{PD}$ value is demodulated using a demodulation scheme similar to I/Q demodulation. The photodiode current signal is provided to a first mixer 122 and a second mixer 124. The first mixer 122 multiplies the photodiode current signal by $\sin(\omega_m t)$ to extract the Q component (where om is the driving frequency of the laser and t is time). The second mixer 124 multiplies the photodiode current signal by $\cos(2\omega_m t)$ to extract the I component.

Subtraction circuits 126 and 128 may be used to subtract a direct current (DC) offset that is provided by DC subtraction logic 134 and 136, respectively, as will be discussed later in greater detail. DC subtraction logic 134 and 136 may sometimes be referred to as offset generation circuits 134 and 136. The DC subtraction may remove noise from the signal. After the offset correction by subtraction circuits 126 and 128, a low-pass filter 130 may filter the Q signal and a low-pass filter 132 may filter the I signal. Performing the demodulation (using mixers 122 and 124) converts the signals from high frequency into low frequency, sometimes referred to as down-mixing. The low-pass filters 130/132 are then applied to the signals to remove noise outside the desired bandwidth. After the low-pass filters are applied, the filtered I/Q signals are output to processing circuitry 140. Mixers 122 and 124, subtraction circuits 126 and 128, low-pass filters 130 and 132, and DC subtraction logic 134 and 136 may sometimes collectively be referred to as demodulation and offset circuitry or I/Q demodulation and offset circuitry.

Processing circuitry 140 may process the Q and I signals to determine a displacement of the target (e.g., the flexible membrane) for the self-mixing proximity sensor. The processing circuitry may calculate $\lambda/(4\pi)*\tan^{-1}(Q/I)$ to determine a displacement ($\Delta L$) of the flexible membrane (where $\lambda$ is the wavelength of operation of the laser). In some cases, the self-mixing proximity sensor may be operated according to a duty cycle. In these scenarios, interpolation and stitching circuitry 142 may use interpolation to determine displacement during off periods and stitch together the measured displacements (from on periods) with interpolated displacements (from off periods) to determine total overall displacement, as will be discussed later in more detail.

To accurately measure displacement, the amplitudes of the Q signal and the I signal need to be balanced (e.g., the amplitude of I should be equal to the amplitude of Q). The I/Q balance may be adjusted using the current modulation depth of laser 102. Laser driver 114 drives the diode 112 between maximum and minimum current magnitudes at a driving frequency (e.g., 350 kHz, between 300 kHz and 400 kHz, or any other desired frequency). The difference between the maximum and minimum current values used by the laser driver may be referred to as the current modulation depth of laser 102. Adjusting the current modulation depth may adjust the I/Q ratio.

Sensing circuitry 110 may include amplitude analysis circuitry 138. The amplitude analysis circuitry 138 may receive the offset and filtered Q and I values from low-pass filters 130 and 132, respectively. Amplitude analysis circuitry 138 may then characterize the amplitudes of Q and I (e.g., using a standard deviation, root mean squares analysis, fast Fourier transform (FFT), etc.). If the determined amplitudes of Q and I are equal (e.g., within 5%, within 3%, within 1%, within 0.1%, etc.), the current modulation depth may remain unchanged. If the determined amplitude of Q is greater than the determined amplitude of I (e.g., by greater than 5%, greater than 3%, greater than 1%, greater than 0.1%, etc.), the current modulation depth may be increased. If the determined amplitude of I is greater than the determined amplitude of Q (e.g., by greater than 5%, greater than 3%, greater than 1%, greater than 0.1%, etc.), the current modulation depth may be decreased. Amplitude analysis circuitry 138 may provide a control signal to laser driver 114 that updates the current modulation depth based on the comparison between the amplitudes of Q and I.

Figure 10:
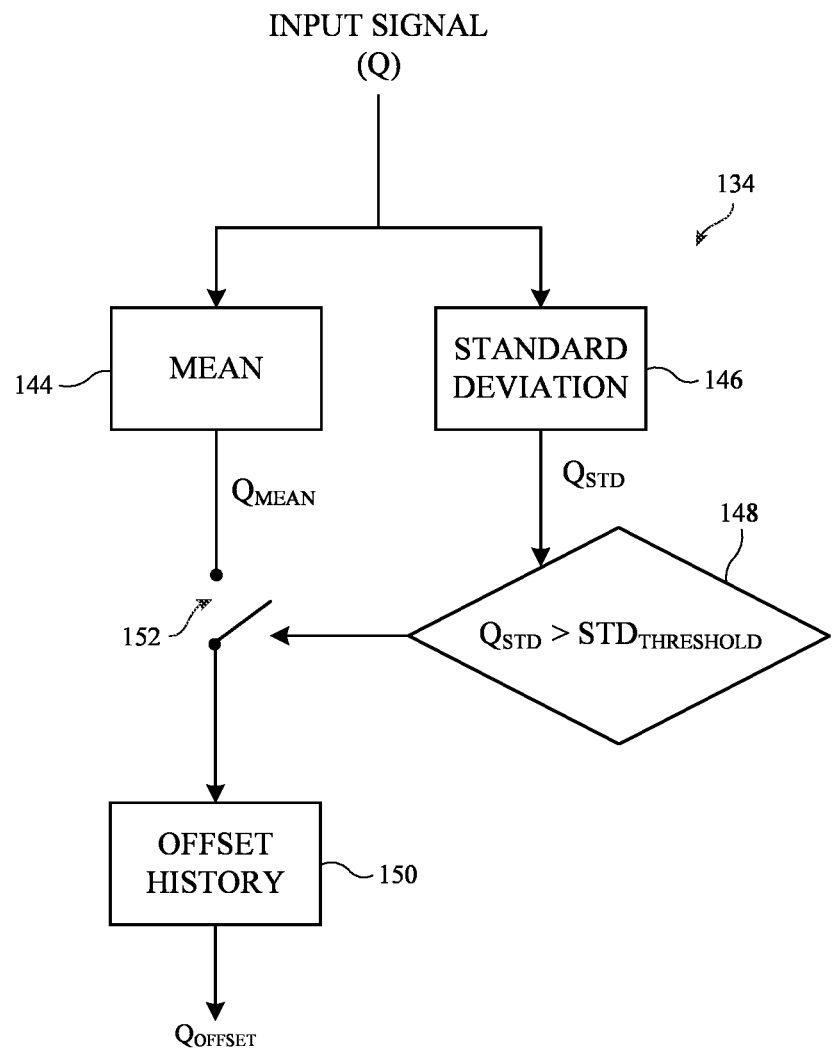
FIG. 10 is a schematic diagram of illustrative DC subtraction logic such as the DC subtraction logic in FIG. 9 that may be used to determine an offset value in accordance with an embodiment.

FIG. 10 is a schematic diagram of DC subtraction logic 134. DC subtraction logic 134 may be used to determine a DC offset that is subtracted from the Q signal by subtraction circuit 126. The DC offset may be determined for the I/Q values over a given time frame (e.g., a period/frame of the duty cycle when the sensor is on).

When the velocity of displacement of the flexible membrane is high, the I/Q signals will have a relatively high frequency. When the velocity of displacement of the flexible membrane is low, the I/Q signals will have a relatively low frequency. At a high frequency, the average of the I/Q signal may be taken as the DC offset. In other words, the offset value for Q is equal to mean(Q) over $T_{ON}$ and the offset value for I is equal to mean(I) over $T_{ON}$ (e.g., an on period of the duty cycle). At low frequency, however, less than 1 period may be present during the time period $T_{ON}$. This means that the average value is not an accurate representation of the DC offset. Accordingly, if the frequency is low and less than 1 period is present during the time period $T_{ON}$, a previously determined offset (from a high frequency $T_{ON}$) may be used. This concept is represented by the schematic diagram of FIG. 10.

As shown, the DC subtraction logic may receive an input signal. In this case, Q will be discussed, but it should be understood that I could be substituted for Q for DC subtraction logic 136. A first block 144 (sometimes referred to as mean calculating circuitry 144) may determine the average of the input signal ($Q_{MEAN}$) whereas a second block 146 (sometimes referred to as standard deviation calculating circuitry 146) may determine the standard deviation of the input signal ($Q_{STD}$). Block 148 (sometimes referred to as comparison circuitry 148) is used to determine if the standard deviation is higher than a predetermined threshold. If the standard deviation is higher than the predetermined threshold ($STD_{THRESHOLD}$), it can be assumed that the input signal has a sufficiently high frequency to provide an accurate offset value. A control signal from block 148 may be provided to switch 152. When $Q_{STD}$ is higher than $STD_{THRESHOLD}$, switch 152 may be closed and $Q_{MEAN}$ is provided to offset history block 150. The offset from offset history block 150 is then provided as $Q_{OFFSET}$ to subtraction circuit 126 (as in FIG. 9).

If, at block 148, the standard deviation is lower than the predetermined threshold ($STD_{THRESHOLD}$), it can be assumed that the input signal has a low frequency that is insufficient to provide an accurate offset value. When $Q_{STD}$ is lower than $STD_{THRESHOLD}$, switch 152 may be opened and $Q_{MEAN}$ is not provided to offset history block 150. The previously stored offset from the most recent frame in which $Q_{STD}>STD_{THRESHOLD}$ is then provided as $Q_{OFFSET}$ to subtraction circuit 126 (as in FIG. 9).

Offset generation circuitry 136 for the I signal may have the same arrangement as offset generation circuitry 134 of FIG. 10 for the Q signal.

In one possible arrangement for self-mixing proximity sensor 66, the self-mixing proximity sensor 66 may operate with a 100% duty cycle. In other words, the self-mixing proximity sensor may always be monitoring for changes in displacement in flexible membrane 62 while the finger device is on. Although an 'always on' approach obtains a maximum amount of data to inform the sensor on displacement, operating at a 100% duty cycle may consume more power than desired. Accordingly, the self-mixing proximity sensor may operate with a duty cycle that is less than 100%. Interpolation and stitching circuitry 142 in FIG. 9 may be used to determine the total displacement of the flexible membrane when the duty cycle is less than 100%.

Figure 11:
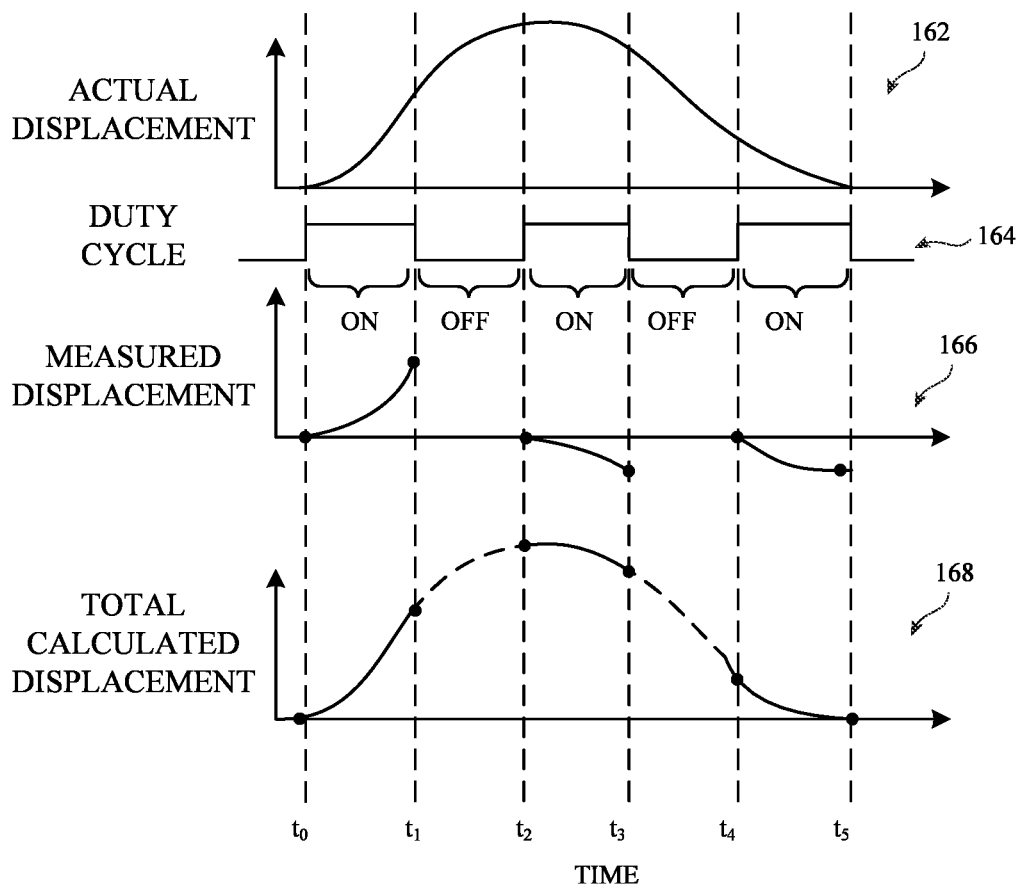
FIG. 11 is a series of graphs showing how an illustrative self-mixing interferometric proximity sensor may operate with a duty cycle and use interpolation and stitching to calculate a total displacement in accordance with an embodiment.

FIG. 11 is a series of graphs showing how the self-mixing proximity sensor may operate with a duty cycle and still determine total displacement. Graph 162 shows the actual displacement of the flexible membrane (e.g., the SMI proximity sensor target) over time. Graph 164 shows the duty cycle of the self-mixing proximity sensor. Graph 166 shows the displacement measured by the self-mixing proximity sensor over time. Graph 168 shows the total calculated displacement determined by interpolation and stitching circuitry 142 over time.

As shown by graph 164, the self-mixing proximity sensor operates at a duty cycle with on periods and off periods. In FIG. 11, the sensor is on from $t_0$ to $t_1$, from $t_2$ to $t_3$, and from $t_4$ to $t_5$. The sensor is off from $t_1$ to $t_2$ and from $t_3$ to $t_4$. As shown by graph 166, displacement from the starting point '0' is measured during each on period ($T_{ON}$). Therefore, displacement measurements are obtained between $t_0$ and $t_1$, between $t_2$ and $t_3$, and between $t_4$ and $t_5$. The shapes of the curves of graph 166 match the shapes of the actual displacement curve of graph 162 during these time periods. However, no displacement measurements are obtained between $t_1$ and $t_2$ and between $t_3$ and $t_4$. Accordingly, the measured displacement during these times in graph 166 are blank or unknown.

Figure 12A:
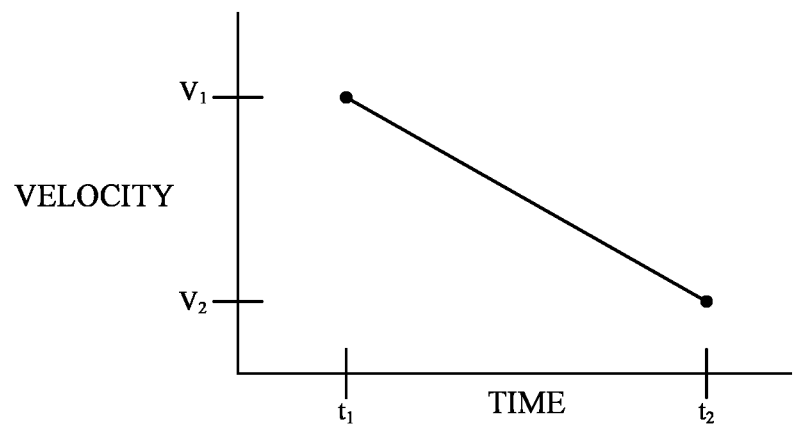
FIG. 12A is a graph of velocity as a function of time showing how velocity interpolation may be used by the sensing circuitry in accordance with an embodiment.

To determine the total displacement, the displacement during the off periods ($T_{OFF}$) may be estimated using interpolation. Specifically, linear interpolation may be used to estimate a velocity of the target during the off period. FIG. 12A shows an example of this type for the off period between $t_1$ and $t_2$. The measured displacement data from $t_0$ to $t_1$ may be used to determine the instantaneous velocity $V_1$ of the target at $t_1$ (when the data gathering ceases). Similarly, measured displacement data from $t_2$ to $t_3$ may be used to determine the instantaneous velocity $V_2$ of the target at $t_2$. An assumption is made that the velocity varies linearly between $t_1$ and $t_2$. FIG. 12A shows the interpolated velocity during the off period between $t_1$ and $t_2$.

Figure 12B:
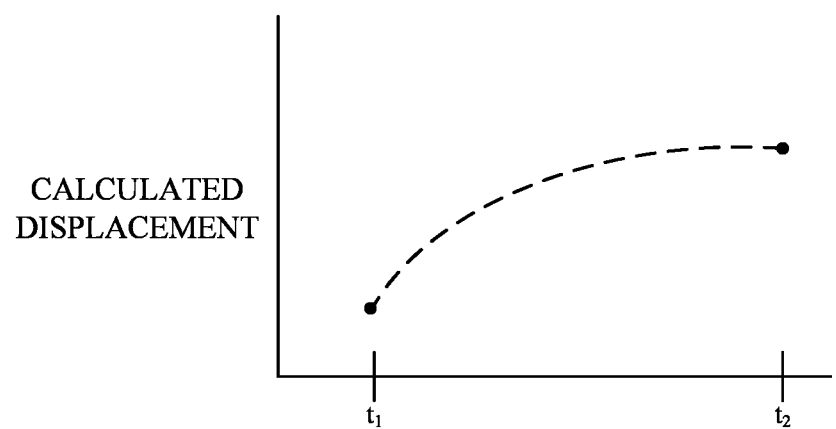
FIG. 12B is a graph of calculated displacement as a function of time showing how the interpolated velocity from FIG. 12A may be integrated to calculate displacement during an off period in accordance with an embodiment.

As shown in FIG. 12B, the interpolated velocity from FIG. 12A is integrated (e.g., by circuitry 142) to determine a calculated (estimated) displacement between $t_1$ and $t_2$. The estimated displacement between $t_1$ and $t_2$ is then stitched (added) to the measured displacement between $t_0$ and $t_1$. The measured displacement between $t_2$ and $t_3$ is stitched (added) to the estimated displacement between $t_1$ and $t_2$. This process may be repeated for each off period to fill in the displacement during the off periods. The resulting total calculated displacement is shown in graph 168 of FIG. 11. The total calculated displacement (determined by the interpolation and stitching circuitry 142) may be used by control circuitry 12 to estimate the force applied by the finger when touching a surface.

The duration of each on period ($T_{ON}$) may be greater than 0.5 milliseconds, greater than 1 millisecond, greater than 2 milliseconds, greater than 5 milliseconds, greater than 8 milliseconds, greater than 20 milliseconds, less than 0.5 milliseconds, less than 1 millisecond, less than 2 milliseconds, less than 5 milliseconds, less than 8 milliseconds, less than 20 milliseconds, between 1 millisecond and 10 milliseconds, etc. The duration of each off period ($T_{OFF}$) may be greater than 0.5 milliseconds, greater than 1 millisecond, greater than 2 milliseconds, greater than 5 milliseconds, greater than 8 milliseconds, greater than 20 milliseconds, greater than 50 milliseconds, greater than 100 milliseconds, less than 0.5 milliseconds, less than 1 millisecond, less than 2 milliseconds, less than 5 milliseconds, less than 8 milliseconds, less than 20 milliseconds, less than 50 milliseconds, less than 100 milliseconds, between 5 milliseconds and 100 milliseconds, etc.

The duty cycle of sensor 66 may be less than 100%, less than 75%, less than 50%, less than 30%, less than 20%, less than 10%, greater than 75%, greater than 50%, greater than 30%, greater than 20%, greater than 10%, greater than 5%, between 5% and 50%, between 20% and 30%, between 40% and 60%, etc.

Figure 13:
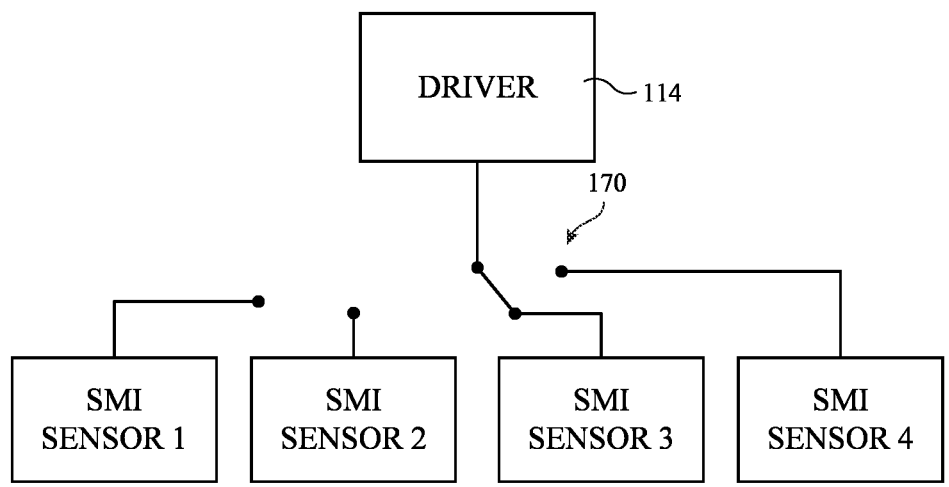
FIG. 13 is a schematic diagram showing how a single laser driver may operate multiple self-mixing interferometric proximity sensors using time-multiplexing in accordance with an embodiment.

If desired, a single laser driver 114 may be shared between the laser diodes of multiple SMI proximity sensors (e.g., at different locations within finger device 10). FIG. 13 is a schematic diagram of a group of sensors of this type. As shown, driver 114 drives self-mixing interferometric proximity sensors 1, 2, 3, and 4. Switching circuitry 170 (e.g., one or more switches) may be coupled between driver 114 and sensors 1, 2, 3, and 4. The sensors may be positioned at different locations within device 10 (e.g., any of the illustrative locations 46 from FIG. 3). Driver 114 may drive sensors 1, 2, 3, and 4 using a time-multiplexing scheme. In other words, driver 114 may drive sensor 1 for a first length of time, then drive sensor 2 for a second length of time, then drive sensor 3 for a third length of time, then drive sensor 4 for a fourth length of time. This cycle may be continuously repeated. The lengths of time each sensor is driven may be equal, such that each sensor has a 25% duty cycle.

The example of FIG. 13 is merely illustrative. In general, a driver 114 may control any desired number of sensors. Those sensors may have equal duty cycles (e.g., 4 sensors at 25% duty cycle) or different duty cycles (e.g., 1 sensor at 50% duty cycle and 2 sensors at 25% duty cycles).

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to have control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

The foregoing is merely illustrative and various modifications can be made to the described embodiments. The foregoing embodiments may be implemented individually or in any combination.

| Table of Reference Numerals | | | |
|---|---|---|---|
| 8 | System | 10 | Finger device |
| 12, 26 | Control circuitry | 14, 28 | Communications circuitry |
| 16, 30 | Input-output devices | 18, 32 | Sensors |
| 20, 34 | Haptic Output Devices | 22, 36 | Other devices |
| 24 | Electronic device | 38 | Wireless link |
| 40 | Finger | 40P | Finger pulp |
| 42 | Fingernail | 44 | Housing |
| 46 | Location | 48 | Surface |
| n | Surface normal | 50 | Structure |
| 60 | Sensor module | 62 | Flexible membrane |
| 64 | Rigid housing structure | 66 | Self-mixing proximity sensor |
| 68, 70 | Distances | 72 | Displacement |
| 74 | Substrate | 76 | Semi-rigid structure |
| 78 | Optically clear filler material | 80 | Sidewall portion |
| 82 | Angled portion | 84 | Base |
| 86 | Finger-interfacing portion | 88 | Rounded corner portion |
| 90 | Planar base portion | 92, 94, 96 | Bends |
| 98 | Transparent cap | 100 | Lens |
| 102 | Laser | 104 | Photodiode |
| 106 | Reflective coating | 110 | Sensing circuitry |
| 112 | Light-emitting diode | 114 | Laser driver |
| 116 | Transimpedance amplifier | 118 | Bias subtraction circuitry |
| 120 | Analog-to-digital converter | 122, 124 | Mixers |
| 126, 128 | Subtraction circuits | 130, 132 | Low-pass filters |
| 134, 136 | DC subtraction logic | 138 | Amplitude analysis circuitry |
| 140 | Processing circuitry | 142 | Interpolation and stitching circuitry |
| 144 | Mean calculating circuitry | 146 | Standard deviation calculating circuitry |
| 148 | Comparison circuitry | 150 | Offset history block |
| 152 | Switch | 162, 164, 166, 168 | Graphs |
| 170 | Switching circuitry | | |

What is claimed is:

1. A finger device configured to be worn on a finger of a user, comprising:
   a housing configured to be coupled to the finger;
   a self-mixing interferometric proximity sensor coupled to the housing that measures changes in a distance between the self-mixing interferometric proximity sensor and a side of the finger; and
   control circuitry configured to determine a force of a touch input by the finger using the self-mixing interferometric proximity sensor, wherein the control circuitry is configured to operate the self-mixing interferometric proximity sensor according to a duty cycle where the self-mixing interferometric proximity sensor alternates between an on state in which the changes in the distance are measured and an off state in which the changes in the distance are not measured and wherein the control circuitry is configured to use interpolation to estimate changes in the distance between the self-mixing interferometric proximity sensor and the side of the finger during the off states.

2. The finger device defined in claim 1, wherein the housing is configured to be coupled to the finger without covering a lower finger pad surface of the finger and wherein determining the force of the touch input by the finger comprises determining the force of the touch input by the lower finger pad surface.

3. The finger device defined in claim 1, wherein the self-mixing interferometric proximity sensor comprises a vertical cavity surface emitting laser.

4. The finger device defined in claim 3, wherein the self-mixing interferometric proximity sensor comprises a photodiode and wherein the control circuitry includes a drive circuit configured to modulate the vertical cavity surface emitting laser and includes a sense circuit configured to use the photodiode to measure corresponding self-mixing fluctuations in output light intensity from the vertical cavity surface emitting laser.

5. The finger device defined in claim 1, further comprising a flexible membrane that conforms to the side of the finger.

6. The finger device defined in claim 5, wherein the flexible membrane comprises silicone.

7. The finger device defined in claim 5, wherein the flexible membrane comprises a flexible layer that is coupled to a reflective layer and wherein the self-mixing interferometric proximity sensor comprises a light source that directs light towards the reflective layer.

8. The finger device defined in claim 5, wherein the self-mixing interferometric proximity sensor comprises a light source and a transparent cap formed over the light source and wherein the transparent cap is interposed between the light source and the flexible membrane.

9. The finger device defined in claim 8, wherein the self-mixing interferometric proximity sensor comprises a lens formed on the transparent cap.

10. The finger device defined in claim 5, further comprising a substrate, wherein the flexible membrane has a first portion that is parallel to the substrate, and wherein, when no force is applied by the finger to the flexible membrane, the flexible membrane has three bends between the first portion and the substrate.

11. The finger device defined in claim 1, wherein the self-mixing interferometric proximity sensor comprises a vertical cavity surface emitting laser and a photodiode, wherein the control circuitry includes sensing circuitry that is configured to determine the changes in the distance between the self-mixing interferometric proximity sensor and the side of the finger, and wherein the sensing circuitry comprises:
- a transimpedance amplifier coupled to the photodiode;
- an analog-to-digital converter coupled to an output of the transimpedance amplifier;
- demodulation and offset circuitry coupled to an output of the analog-to-digital converter, wherein the demodulation and offset circuitry outputs an I signal and a Q signal; and
- processing circuitry configured to determine displacement based on the I signal and the Q signal.

12. The finger device defined in claim 11, wherein the demodulation and offset circuitry includes offset generation circuitry that is configured to output a stored offset value.

13. The finger device defined in claim 11, wherein the sensing circuitry further comprises:
- amplitude analysis circuitry that is configured to adjust the vertical cavity surface emitting laser based on a ratio between amplitudes of the I signal and the Q signal.

14. A finger device configured to be worn on a finger of a user, comprising:
- a housing configured to be coupled to the finger;
- a self-mixing interferometric proximity sensor module coupled to the housing, wherein the self-mixing interferometric proximity sensor module comprises a substrate, a self-mixing interferometric proximity sensor on the substrate, a rigid structure, and at least one flexible sidewall that couples the rigid structure to the substrate; and
- control circuitry configured to determine a force of a touch input by the finger using the self-mixing interferometric proximity sensor.

15. The finger device defined in claim 14, wherein the housing is configured to be coupled to the finger without covering a lower finger pad surface of the finger and wherein determining the force of the touch input by the finger comprises determining the force of the touch input by the lower finger pad surface.

16. The finger device defined in claim 14, wherein the self-mixing interferometric proximity sensor comprises a vertical cavity surface emitting laser.

17. The finger device defined in claim 16, wherein the self-mixing interferometric proximity sensor comprises a photodiode and wherein the control circuitry includes a drive circuit configured to modulate the vertical cavity surface emitting laser and includes a sense circuit configured to use the photodiode to measure corresponding self-mixing fluctuations in output light intensity from the vertical cavity surface emitting laser.

18. A finger device configured to be worn on a finger of a user, comprising:
- a housing configured to be coupled to the finger;
- a self-mixing interferometric proximity sensor coupled to the housing that measures changes in a distance between the self-mixing interferometric proximity sensor and a side of the finger, wherein the self-mixing interferometric proximity sensor comprises a vertical cavity surface emitting laser and a photodiode; and
- control circuitry configured to determine a force of a touch input by the finger using the self-mixing interferometric proximity sensor, wherein the control circuitry is configured to obtain an I signal and a Q signal using output from the photodiode and wherein the vertical cavity surface emitting laser is updated based on a ratio between amplitudes of the I signal and the Q signal.

19. The finger device defined in claim 18, wherein the housing is configured to be coupled to the finger without covering a lower finger pad surface of the finger and wherein determining the force of the touch input by the finger comprises determining the force of the touch input by the lower finger pad surface.

* * * * *